(12) United States Patent
Lee et al.

(10) Patent No.: US 12,361,637 B2
(45) Date of Patent: Jul. 15, 2025

(54) VIDEO OUTPUT DEVICE

(71) Applicant: KOREA FUEL-TECH CORPORATION, Anseong-si (KR)

(72) Inventors: Geun Woo Lee, Yongin-si (KR); Hyun Man Chang, Gunpo-si (KR); Cheol Kim, Bucheon-si (KR)

(73) Assignee: KOREA FUEL-TECH CORPORATION, Anseong-si (KR)

(*) Notice: Subject to any disclaimer, the term of this patent is extended or adjusted under 35 U.S.C. 154(b) by 198 days.

(21) Appl. No.: 18/037,106

(22) PCT Filed: Oct. 15, 2021

(86) PCT No.: PCT/KR2021/014318
§ 371 (c)(1),
(2) Date: May 16, 2023

(87) PCT Pub. No.: WO2022/102996
PCT Pub. Date: May 19, 2022

(65) Prior Publication Data
US 2023/0419603 A1    Dec. 28, 2023

(30) Foreign Application Priority Data
Nov. 16, 2020 (KR) .......... 10-2020-0153005

(51) Int. Cl.
*G06T 17/00* (2006.01)
*G06T 3/40* (2006.01)

(52) U.S. Cl.
CPC .......... *G06T 17/00* (2013.01); *G06T 3/40* (2013.01)

(58) Field of Classification Search
None
See application file for complete search history.

(56) References Cited

U.S. PATENT DOCUMENTS

| 2018/0006762 A1* | 1/2018 | Yang ............ H04N 21/6582 |
| 2019/0208114 A1 | 7/2019 | Ginat et al. |
| 2020/0057589 A1 | 2/2020 | Jo et al. |

FOREIGN PATENT DOCUMENTS

| JP | 2004007315 A | 1/2004 |
| JP | 2005175995 A | 6/2005 |
| JP | 2009-260820 A | 11/2009 |
| KR | 10-2008-0066543 A | 7/2008 |
| KR | 10-2014-0010715 A | 1/2014 |
| KR | 10-2015-0026336 A | 3/2015 |
| KR | 10-2015-0098362 A | 8/2015 |
| KR | 10-2018-0003733 A | 1/2018 |
| KR | 10-2290328 B1 | 8/2021 |
| WO | 2020053182 A1 | 3/2020 |

* cited by examiner

*Primary Examiner* — Tapas Mazumder
(74) *Attorney, Agent, or Firm* — Bridgeway IP Law Group, PLLC; Jihun Kim

(57) ABSTRACT

A video output device includes: a display unit configured to output a video signal received from an outside; an input unit into which user's selection information on an output mode of the display unit is input from a user; and a communication unit configured to transmit pixel information of the display unit corresponding to the selection information input through the input unit to a video signal transmission device. The video output device allows a user to freely adjust the size of an output image on the display unit by changing a video signal received from an outside according to the user's selection.

4 Claims, 3 Drawing Sheets

VIDEO OUTPUT DEVICE

TECHNICAL FIELD

The present invention relates to a video output device, and more particularly, to a video output device which allows a user to freely adjust the size of an output image on a display unit by changing a video signal received from an outside according to the user's selection.

BACKGROUND ART

Virtual reality (VR) refers to a specific environment or situation, or the technique itself, which is similar to reality created by artificial technique using a computer, etc., but is not a real word.

The virtual environment or situation created as described above excites the user's five senses and allows the user to freely move in and out of the boundary between reality and fantasy by providing a spatial and temporal experience similar to the reality.

Meanwhile, a market of this VR is already established as a multi-billion dollar industry, and is expected to continue growing well beyond a 120-billion dollar industry within a few years. As the VR market grows rapidly, many companies are rushing to develop various display devices which provide virtual images to the users.

However, conventional display devices for providing virtual reality only remain at the function of passively outputting a video signal received from an outside, but do not implement a function capable of changing the video signal received from the outside matching with the user's intention.

SUMMARY OF INVENTION

Problems to be Solved by Invention

Accordingly, an object of the present invention is to provide a video output device which allows a user to freely adjust the size of an output image on a display unit by changing a video signal received from an outside according to the user's selection.

Means for Solving Problems

To achieve the above object, according to an aspect of the present invention, there is provided a video output device including: a display unit configured to output a video signal received from an outside; an input unit into which user's selection information on an output mode of the display unit is input from a user; and a communication unit configured to transmit pixel information of the display unit corresponding to the selection information input through the input unit to a video signal transmission device.

Preferably, the video output device further includes a controller configured to change the pixel information of the display unit based on the selection information input through the input unit.

In addition, the communication unit may receive a video signal which is changed according to the pixel information changed by the controller from the video signal transmission device.

Further, the display unit may output the video signal which is changed according to the pixel information changed by the controller.

Furthermore, when the selection information input through the input unit is an output mode for outputting a vertically enlarged image, the controller may change the pixel information of the display unit from 1920×1080 to 1080×1920.

Meanwhile, a video output device according to the present invention includes: a display unit which is configured to output a video signal received from a video signal transmission device, and comprises a first display unit configured to output an image in a direction of user's left eye, and a second display unit configured to output an image in a direction of user's right eye; an input unit configured to input user's selection information on a video output mode of the display unit by a user, wherein the video output mode includes a landscape image mode, which is a mode to output a horizontally enlarged image and a portrait image mode, which is a mode to output a vertically enlarged image; a controller configured to change pixel information of a display region where images are output in the landscape image mode and the portrait mode image mode, so that, when the user's selection information is input therein through the input unit, information on the number of horizontal pixels and information on the number of vertical pixels are changed with each other in the display unit while information on the number of total pixels is equally maintained in the display unit; and a communication unit configured to transmit the pixel information of the display unit, in which the information on the number of horizontal pixels and the information on the number of vertical pixels are changed with each other, to the video signal transmission device.

Advantageous Effects

According to the present invention, it is possible to provide a video output device which allows a user to freely adjust the size of the image output on the display unit by changing a video signal received from an outside according to the user's selection.

MODE FOR CARRYING OUT INVENTION

Figure 1:
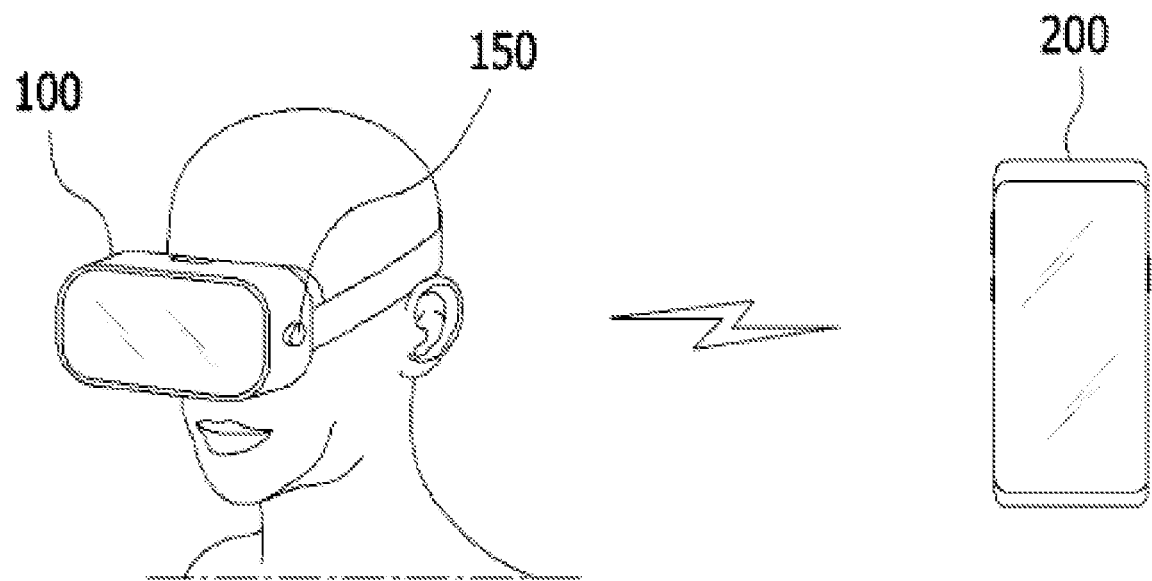
FIG. 1 is a schematic view illustrating a state of using a video output device according to an embodiment of the present invention by a user.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

FIG. 1 is a schematic view illustrating a state of using a video output device 100 according to an embodiment of the present invention by a user. As shown in FIG. 1, the video output device 100 according to an embodiment of the present invention may be a virtual image monitor (VIM)

device which outputs a video signal received from a video signal transmission device 200 such as a smartphone, etc., thereby allowing a user wearing the video output device 100 to experience virtual reality.

Figure 2:
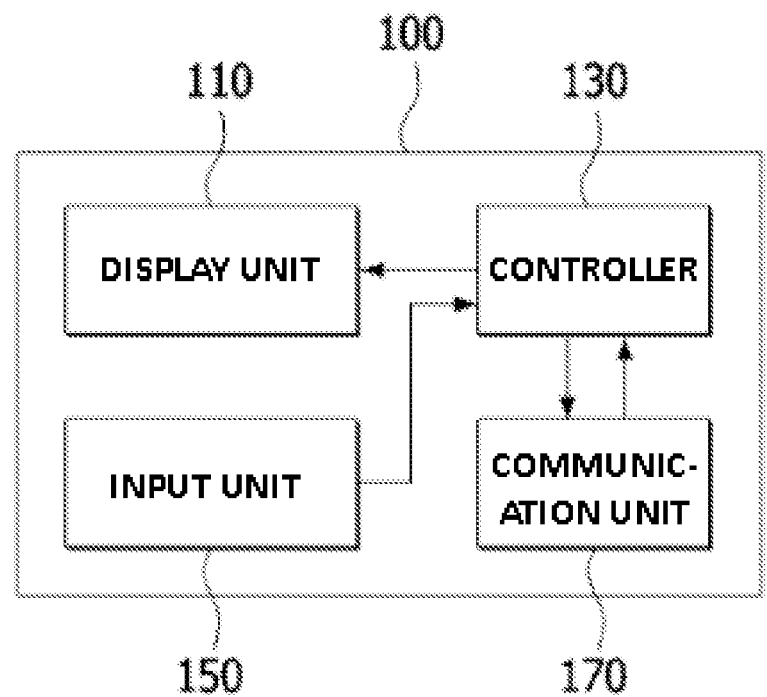
FIG. 2 is a functional block diagram illustrating a structure of the video output device according to an embodiment of the present invention.

FIG. 2 is a functional block diagram illustrating a structure of the video output device 100 according to an embodiment of the present invention. Referring to FIG. 2, the video output device 100 according to an embodiment of the present invention includes a display unit 110, a controller 130, an input unit 150 and a communication unit 170.

The display unit 110 outputs the video signal received from the video signal transmission device 200 so that the user can experience virtual reality. Here, the user's selection information on an output mode of the display unit 110 is input through the input unit 150 from the user.

Specifically, as shown in FIG. 1, the input unit 150 may be implemented in the form of an input button provided on an outer surface of the video output device 100. Thereby, the user may switch the output mode of the display unit 110 in a manner of pressing the input button provided on the outside during using the video output device 100.

Meanwhile, the controller 130 changes pixel information of the display unit 110 according to the user's selection information on the output mode of the display unit 110 input therein through the input unit 150.

The communication unit 170 not only receives the video signal from the video signal transmission device 200, but also transmits the pixel information of the display unit 110, which is changed by the controller 130 according to the user's selection information on the output mode of the display unit 110 input through the input unit 150 from the user, to the video signal transmission device 200.

Figure 3:
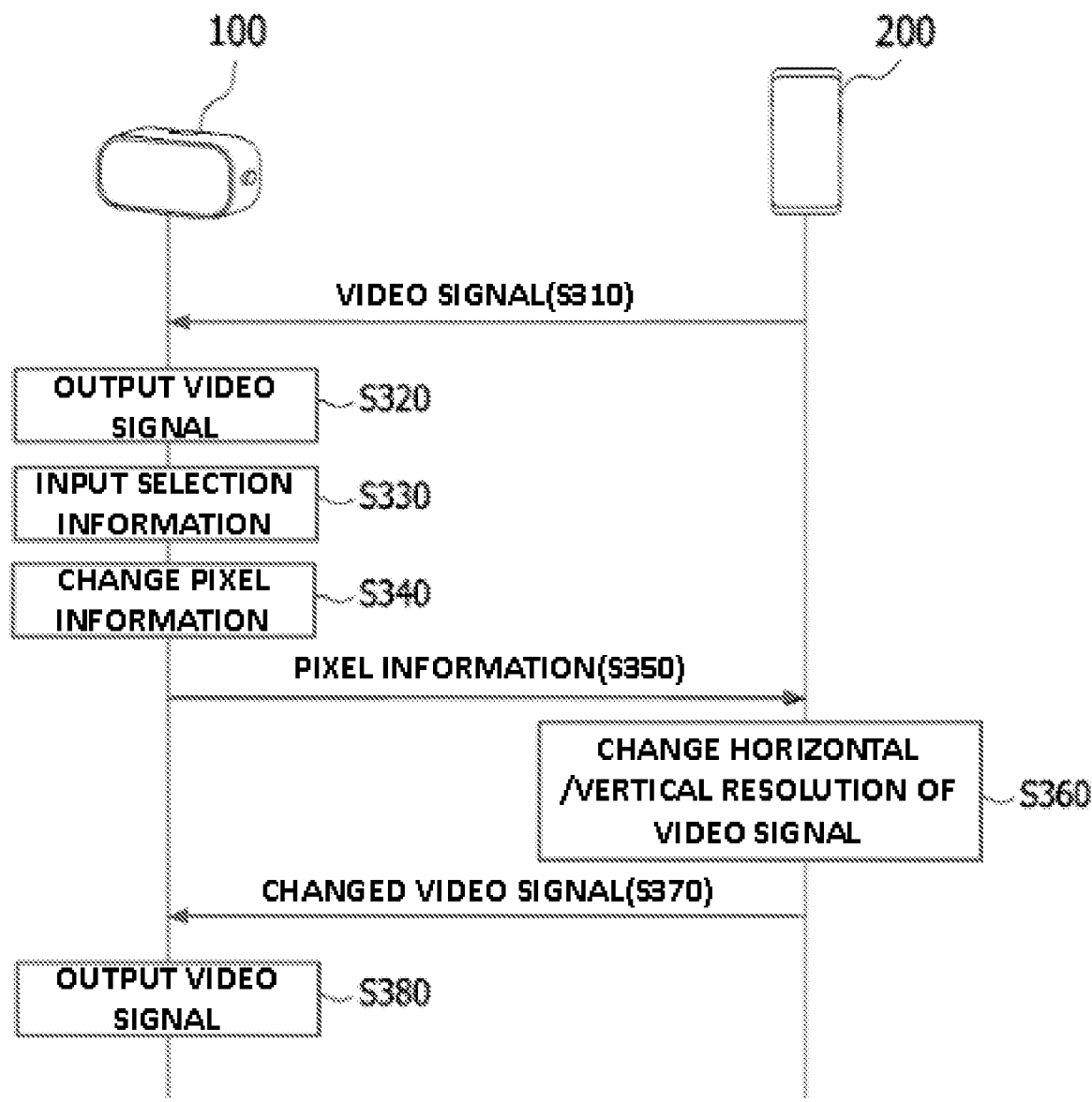
FIG. 3 is a signal flow chart describing an operation process of the video output device according to an embodiment of the present invention.

FIG. 3 is a signal flow chart describing an operation process of the video output device 100 according to an embodiment of the present invention. Hereinafter, the operation process of the video output device 100 according to an embodiment of the present invention will be described with reference to FIGS. 1 to 3.

First, by turning on the power of the video output device 100, the communication unit 170 of the video output device 100 and a communication module of the video signal transmission device 200 are connected with each other in a wired or wireless communication manner. Then, the communication unit 170 of the video output device 100 transmits basic pixel information (e.g., 1920×1080) of the display unit 110 to the video signal transmission device 200.

Thereby, the video signal transmission device 200 may set a resolution of the image transmitted to the video output device 100 matching with the basic pixel information (e.g., 1920×1080) of the display unit 110.

Figure 4:
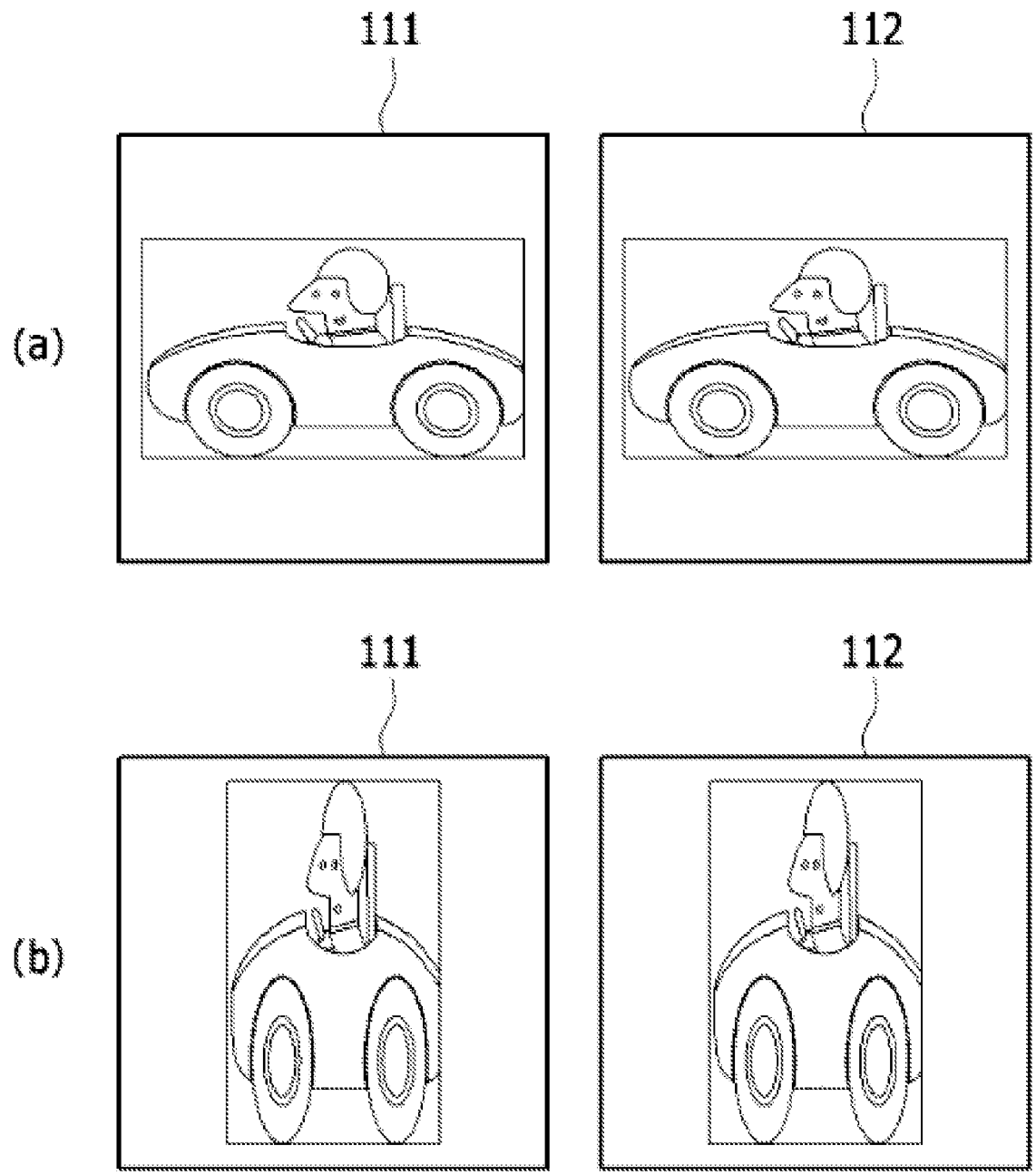
FIG. 4 is exemplary views illustrating output images for each video output mode in the video output device according to an embodiment of the present invention.

When the video signal set as described above is transmitted from the video signal transmission device 200 to the video output device 100 (S310), the display unit 110 of the video output device 100 may output images as shown in FIG. 4 (*a*) through a first display unit 111 configured to output an image in a direction of user's left eye and a second display unit 112 configured to output an image in a direction of user's right eye, respectively (S320).

Meanwhile, when a user wants to view the video by vertically enlarging as shown in FIG. 4 (*a*), the user may press the input unit 150 provided in the form of the button on the outer surface of the video output device 100 in FIG. 1, thus to input selection information on the output mode of the display unit 110 to change it to a portrait mode (S330).

In this way, when the output mode of the display unit 110 is selected from a landscape mode to the portrait mode by the user, the controller 130 changes the pixel information of the display unit 110 from the pixel information (e.g., 1920×1080) in step S310 to pixel information (e.g., 1080×1920) for outputting the image in the portrait mode (S340).

Specifically, the controller 130 changes pixel information of a display region where images are output in the landscape image mode and the portrait mode image mode so that information on the number of horizontal pixels and information on the number of vertical pixels are changed with each other in the display unit 110 while information on the number of total pixels is equally maintained in the display unit 110.

The pixel information changed as described above is transmitted to the video signal transmission device 200 through the communication unit 170 of the video output device 100, such that the video signal transmission device 200 may change and set the resolution of the image transmitted to the video output device 100 so as to meet the changed pixel information (e.g., 1080×1920 pixels) received from the video output device 100.

That is, when the portrait mode is selected by the user as the output mode of the display unit 110 in the above-described step S330, the video signal transmission device 200 changes the resolution of the image transmitted to the video output device 100 from 1920×1080 to 1080×1920, such that horizontal and vertical resolutions of the video signal will be changed with each other (S360).

When a video signal, in which the horizontal resolution and the vertical resolution are changed as described above, is transmitted from the video signal transmission device 200 to the video output device 100 (S370), the display unit 110 of the video output device 100 may output the vertically enlarged images (i.e., portrait mode images) as shown in FIG. 4 (*b*) through the first display unit 111 and the second display unit 112, respectively (S380).

Meanwhile, when the user wants to view the video by changing the portrait mode image as shown in FIG. 4 (*b*) to a landscape mode image as in FIG. 4 (*a*) again, the user may press the input unit 150 provided in a button structure on the outer surface of the video output device 100 once more, thus to input selection information on the output mode of the display unit 110 for outputting the image in the landscape mode (S330).

As such, when the output mode of the display unit 110 is selected from the portrait mode to the landscape mode by the user, the controller 130 changes the pixel information of the display unit 110 from 1080×1920 to 1920×1080 again (S340).

The pixel information changed as described above is transmitted to the video signal transmission device 200 through the communication unit 170 of the video output device 100, and the video signal transmission device 200 resets the resolution of the image to be transmitted to the video output device 100 matching with the pixel information (1920×1080) received from the video output device 100.

That is, when the user selects to change the output mode of the display unit 110 from portrait mode to landscape mode in the above-described step S330, the video signal transmission device 200 changes the resolution of the image transmitted to the video output device 100 from 1080×1920 to 1920×1080, such that the horizontal and vertical resolutions of the video signal are changed with each other (S360).

As a video signal, in which the horizontal resolution and the vertical resolution are changed as described above, is transmitted from the video signal transmission device 200 to the video output device 100 (S370), the display unit 110 of the video output device 100 may output the landscape mode images as shown in FIG. 4 (*a*) through the first display unit 111 and the second display unit 112, respectively (S380).

Terms used in the present invention are used only to describe specific embodiments, and are not intended to limit the present invention. Singular expressions used herein include plural expressions unless they have definitely opposite meanings in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

While the present invention has been described with reference to the preferred embodiments and modified examples, the present invention is not limited to the above-described specific embodiments and the modified examples, and it will be understood by those skilled in the art that various modifications and variations may be made therein without departing from the scope of the present invention as defined by the appended claims, as well as these modifications and variations should not be understood separately from the technical idea and prospect of the present invention.

INDUSTRIAL APPLICABILITY

The present invention is applicable to the field of Virtual Image Monitor (VIM), such that industrial applicability thereof is recognized.

The invention claimed is:

1. A video output device comprising:
a display unit configured to output a video signal received from a video signal transmission device, the display unit including a first display unit configured to output a video in a direction of a left eye of a user and a second display unit configured to output the video in a direction of a right eye of the user;
an input button configured to input selection information of the user on an output mode of the display unit, the output mode including a landscape mode that outputs a horizontally enlarged image and a portrait mode that outputs a vertically enlarged image;
a controller configured to change pixel information of the display unit when the user changes the output mode between the landscape mode and the portrait mode through the input button, such that information on a number of horizontal pixels and information on a number of vertical pixels of the display unit are changed with each other while information on a total number of pixels of the display unit is maintained; and
a wired or wireless communication unit configured to transmit the pixel information of the display unit, in which the information on the number of horizontal pixels and the information on the number of vertical pixels are changed with each other, to the video signal transmission device.

2. The video output device according to claim 1,
wherein the wired or wireless communication unit is configured to receive a video signal which is changed according to the pixel information changed by the controller from the video signal transmission device.

3. The video output device according to claim 1,
wherein the video signal transmission device is configured to change, based on the pixel information, a horizontal resolution and a vertical resolution of the video that is to be transmitted to the video output device.

4. The video output device of claim 3,
wherein the wired or wireless communication unit is configured to receive the video, in which the horizontal resolution and the vertical resolution are changed with each other, from the video signal transmission device.

* * * * *